(12) United States Patent
Alfiad et al.

(10) Patent No.: US 10,404,397 B2
(45) Date of Patent: Sep. 3, 2019

(54) WAVELENGTH DIVISION MULTIPLEXED TELECOMMUNICATION SYSTEM WITH AUTOMATIC COMPENSATION OF CHROMATIC DISPERSION

(71) Applicant: ADVA Optical Networking SE, Meiningen (DE)

(72) Inventors: Mohammad Alfiad, Duluth, GA (US); Fuerst Cornelius, Fuerstenfeldbruck (DE); Sorin Tibuleac, Johns Creek, GA (US); Christophe Meyer, Meiningen (DE)

(73) Assignee: ADVA OPTICAL NETWORKING SE, Meiningen Ot Dreissigacker (DE)

( * ) Notice: Subject to any disclaimer, the term of this patent is extended or adjusted under 35 U.S.C. 154(b) by 0 days.

(21) Appl. No.: 14/757,689

(22) Filed: Dec. 23, 2015

(65) Prior Publication Data
US 2017/0187482 A1   Jun. 29, 2017

(51) Int. Cl.
*H04B 10/2513*   (2013.01)
*H04J 14/02*   (2006.01)
(Continued)

(52) U.S. Cl.
CPC ........ *H04J 14/02* (2013.01); *H04B 10/25133* (2013.01); *H04B 10/541* (2013.01);
(Continued)

(58) Field of Classification Search
CPC ... H04J 14/02; H04B 10/541; H04B 10/6161; H04B 10/25133; H04B 10/6971; H04L 5/0048
(Continued)

(56) References Cited

U.S. PATENT DOCUMENTS

| 4,551,019 A | 11/1985 | Vella et al. |
| 4,750,833 A * | 6/1988 | Jones ............... G01M 11/333 356/73.1 |

(Continued)

FOREIGN PATENT DOCUMENTS

| EP | 0 499 388 A2 | 8/1992 |
| EP | 1 265 062 A2 | 12/2002 |

(Continued)

OTHER PUBLICATIONS

Sugawara et al, Unofficial Translation of JP2004228925A, 2004, All Document.*

(Continued)

*Primary Examiner* — Kenneth N Vanderpuye
*Assistant Examiner* — Dibson J Sanchez
(74) *Attorney, Agent, or Firm* — Jenkins, Wilson, Taylor & Hunt P.A.

(57) ABSTRACT

A wavelength division multiplexed telecommunication system with automatic compensation of chromatic dispersion in a predetermined wavelength band, said WDM telecommunication system comprising a probe signal detection unit at a receiver side adapted to detect amplitude modulated probe signals generated by a probe signal generation unit at a transmitter side with a predetermined relative phase difference and transmitted through an optical link to said receiver side; and a chromatic dispersion compensation unit adapted to compensate the chromatic dispersion in response to a relative phase difference of the amplitude modulated probe signals detected by said probe signal detection unit at the receiver side.

29 Claims, 8 Drawing Sheets

(51) Int. Cl.
  *H04B 10/54* (2013.01)
  *H04B 10/61* (2013.01)
  *H04L 5/00* (2006.01)
  *H04B 10/69* (2013.01)
(52) U.S. Cl.
  CPC ..... *H04B 10/6161* (2013.01); *H04B 10/6971* (2013.01); *H04L 5/0048* (2013.01)
(58) Field of Classification Search
  USPC ............................. 398/29, 81, 147–150, 159
  See application file for complete search history.

(56) References Cited

U.S. PATENT DOCUMENTS

| | | | | |
|---|---|---|---|---|
| 4,799,789 A | * | 1/1989 | Tsukamoto | G01M 11/333 356/73.1 |
| 4,799,790 A | * | 1/1989 | Tsukamoto | G01M 11/333 356/73.1 |
| 4,984,884 A | * | 1/1991 | Ryu | G01M 11/333 356/73.1 |
| 5,062,703 A | * | 11/1991 | Wong | G01M 11/3172 356/73.1 |
| 5,406,368 A | * | 4/1995 | Horiuchi | G01M 11/333 356/73.1 |
| 5,432,602 A | * | 7/1995 | Sharma | G01J 9/00 356/326 |
| 5,463,461 A | * | 10/1995 | Horiuchi | H04B 10/64 356/484 |
| 5,473,457 A | * | 12/1995 | Ono | G02B 6/278 385/11 |
| 5,673,133 A | * | 9/1997 | Imaoka | H04B 10/2503 356/73.1 |
| 5,717,510 A | * | 2/1998 | Ishikawa | H04L 7/0037 398/147 |
| 5,969,806 A | * | 10/1999 | Bergano | G01M 11/333 356/73.1 |
| 6,055,082 A | * | 4/2000 | Chikuma | H04B 10/2525 398/148 |
| 6,081,360 A | * | 6/2000 | Ishikawa | H04B 10/2519 398/1 |
| 6,154,273 A | * | 11/2000 | Suzuki | G01M 11/333 356/73.1 |
| 6,229,631 B1 | * | 5/2001 | Sato | H04B 10/0775 398/147 |
| 6,411,416 B1 | * | 6/2002 | Ooi | H04B 10/2519 398/141 |
| 6,456,411 B1 | * | 9/2002 | Ishikawa | H04B 10/25133 398/192 |
| 6,487,352 B1 | * | 11/2002 | Sobiski | H04B 10/25133 398/147 |
| 6,580,542 B1 | * | 6/2003 | Song | H04B 10/25133 398/140 |
| 6,594,003 B1 | * | 7/2003 | Horiuchi | G01M 11/333 356/73.1 |
| 6,614,511 B1 | * | 9/2003 | Sakairi | G01J 9/00 356/73.1 |
| 6,658,210 B1 | * | 12/2003 | Fee | H04B 10/2503 398/34 |
| 6,778,782 B1 | * | 8/2004 | Watley | H04B 10/2519 398/147 |
| 7,027,137 B2 | * | 4/2006 | Kimura | G01M 11/333 356/73.1 |
| 7,035,538 B2 | * | 4/2006 | Willner | H04B 10/07 398/29 |
| 7,450,856 B2 | * | 11/2008 | Yoshimoto | H04B 10/25133 398/147 |
| 7,689,126 B2 | * | 3/2010 | Nemoto | H04B 10/2519 398/147 |
| 7,813,647 B2 | * | 10/2010 | Ohtani | H04B 10/25133 398/147 |
| 8,131,148 B2 | | 3/2012 | Sun et al. | |
| 8,433,192 B2 | | 4/2013 | Frankel et al. | |
| 8,750,726 B2 | | 6/2014 | Geyer | |
| 8,855,498 B2 | * | 10/2014 | Tanaka | H04B 10/5055 398/159 |
| 10,122,460 B2 | | 11/2018 | Alfiad et al. | |
| 2001/0030787 A1 | | 10/2001 | Tajima | |
| 2001/0035996 A1 | * | 11/2001 | Havstad | H04B 10/2519 398/147 |
| 2001/0050767 A1 | | 12/2001 | Babin et al. | |
| 2002/0003621 A1 | * | 1/2002 | Kimura | G01M 11/333 356/73.1 |
| 2002/0003646 A1 | | 1/2002 | Ishikawa | |
| 2002/0018213 A1 | * | 2/2002 | Ibukuro | G01M 11/333 356/484 |
| 2002/0044273 A1 | * | 4/2002 | Kimura | G01M 11/333 356/73.1 |
| 2002/0044274 A1 | * | 4/2002 | Kimura | G01M 11/335 356/73.1 |
| 2002/0085194 A1 | * | 7/2002 | Yamashita | G01M 11/333 356/73.1 |
| 2002/0158191 A1 | * | 10/2002 | Graves | H04B 10/25133 250/227.23 |
| 2002/0186437 A1 | * | 12/2002 | Sasaoka | G01M 11/333 398/158 |
| 2003/0002112 A1 | * | 1/2003 | Hirano | H04B 10/25133 398/147 |
| 2004/0067056 A1 | * | 4/2004 | Kido | G01M 11/338 398/9 |
| 2004/0105684 A1 | * | 6/2004 | Marutani | H04B 10/2513 398/147 |
| 2004/0130725 A1 | * | 7/2004 | Kido | G01N 21/17 356/484 |
| 2004/0156038 A1 | | 8/2004 | Cao | |
| 2004/0190906 A1 | * | 9/2004 | Jain | H04B 10/2519 398/147 |
| 2005/0146710 A1 | * | 7/2005 | Zaacks | G01M 11/333 356/73 |
| 2005/0225746 A1 | * | 10/2005 | Nishikawa | G01M 11/333 356/73.1 |
| 2005/0226613 A1 | | 10/2005 | Raddatz | |
| 2006/0038975 A1 | * | 2/2006 | Doerr | H04B 10/25133 356/10 |
| 2006/0110165 A1 | | 5/2006 | Seguineau et al. | |
| 2006/0188255 A1 | | 8/2006 | Tian et al. | |
| 2007/0047964 A1 | * | 3/2007 | Ooi | H04B 10/66 398/147 |
| 2008/0187323 A1 | * | 8/2008 | Honda | H04B 10/25133 398/159 |
| 2008/0273879 A1 | * | 11/2008 | Yamada | H04B 10/2513 398/81 |
| 2009/0297140 A1 | * | 12/2009 | Heismann | G01M 11/333 398/16 |
| 2010/0092185 A1 | * | 4/2010 | Nemoto | H04B 10/2513 398/208 |
| 2010/0128344 A1 | | 5/2010 | Lichtman | |
| 2010/0284701 A1 | | 11/2010 | Lin et al. | |
| 2010/0303459 A1 | * | 12/2010 | Yuki | H04B 10/25133 398/25 |
| 2011/0123191 A1 | | 5/2011 | Murakami et al. | |
| 2011/0188854 A1 | * | 8/2011 | Honda | H04B 10/07 398/38 |
| 2011/0211847 A1 | * | 9/2011 | Noheji | H04B 10/25133 398/208 |
| 2011/0229153 A1 | * | 9/2011 | Sekine | H04B 10/25133 398/208 |
| 2012/0020661 A1 | * | 1/2012 | Kaburagi | H04B 10/25133 398/26 |
| 2012/0230673 A1 | | 9/2012 | Striegler et al. | |
| 2012/0281981 A1 | | 11/2012 | Le Taillandier De Gabory et al. | |
| 2014/0023360 A1 | | 1/2014 | Iizuka | |
| 2016/0087747 A1 | * | 3/2016 | Way | H04J 14/0221 398/81 |
| 2016/0218812 A1 | | 7/2016 | Okabe et al. | |

(56) References Cited

U.S. PATENT DOCUMENTS

2016/0285559 A1 9/2016 Xie et al.
2018/0205461 A1 7/2018 Alfiad et al.

FOREIGN PATENT DOCUMENTS

EP 1 630 982 A1 3/2006
WO WO 2008/147758 A1 12/2008

OTHER PUBLICATIONS

Hirano et al, Dispersion accommodation scheme comparing relative bit phase of two SSB signals generated from spectrally filtered CSRZ signal, Jun. 2002, Electronic Letters vol. 38 Issue: 12, pp. 580-582.*
Hauske et al., "Frequency Domain Chromatic Dispersion Estimation," Proc. OFC Conference 2010, Paper JThA11, pp. 1-3 (2010).
Kuschnerov et al., "Adaptive Chromatic Dispersion Equalization for Non-Dispersion Managed Coherent Systems," Proc. OFC Conference 2009, Paper OMT1, pp. 1-3 (2009).
Yao et al., "Spectrum Superposition Based Chromatic Dispersion Estimation for Digital Coherent Receivers," in Proc. ECOC Conference 2014, Paper P3.17, pp. 1-3 (2014).
Commonly-assigned, co-pending U.S. Appl. No. 15/406,027 for "Methods and Apparatus for Automatic Compensation fo Chromatic Disperson," (Unpublished, filed Jan. 13, 2017).
Extended European Search Report for European Patent Application No. 16170392 (dated May 10, 2017).
Non-Final Office Action for U.S. Appl. No. 15/406,027 (dated Nov. 16, 2017).
Diniz et al., "Hardware-Efficient Chromatic Dispersion Estimator based on Parallel Gardner Timing Error Detector," Proc. OFC Conference 2013, Paper OTh3C.6, pp. 1-3 (2013).
Communication of the Partial European Search Report for European Application No. 17196816.7 (dated May 3, 2018).
Gnauck et al., "Generation and Transmission of 21.4-Gbaud PDM 64-QAM Using a Novel High-Power DAC Driving a Single I/Q Modulator", Journal of Lightwave Technology, vol. 30, No. 4, pp. 532-536 (Feb. 1, 2012).
Notice of Allowance and Fee(s) Due for U.S. Appl. No. 15/406,027 (dated Jun. 26, 2018).
Supplemental Notice of Allowance and Fee(s) Due for U.S. Appl. No. 15/406,027 (dated Oct. 11, 2018).
Extended European Search Report for European Application No. 17196816.7 (dated Sep. 28, 2018).
Schmogrow et al., "Error Vector Magnitude as a Performance Measure for Advanced Modulation Formats," IEEE Photonics Technology Letters, IEEE Service Center, Piscataway, NJ, US, vol. 24, No. 1, pp. 61-63 (Jan. 1, 2012).
Freude et al., "Quality metrics for optical signals: Eye diagram, Q-factor, OSNR, EVM and BER," 2012 14th International Conference on Transparent Optical Networks (ICTON 2012), Coventry, United Kingdom, pp. 1-4, (Jul. 2, 2012).

* cited by examiner

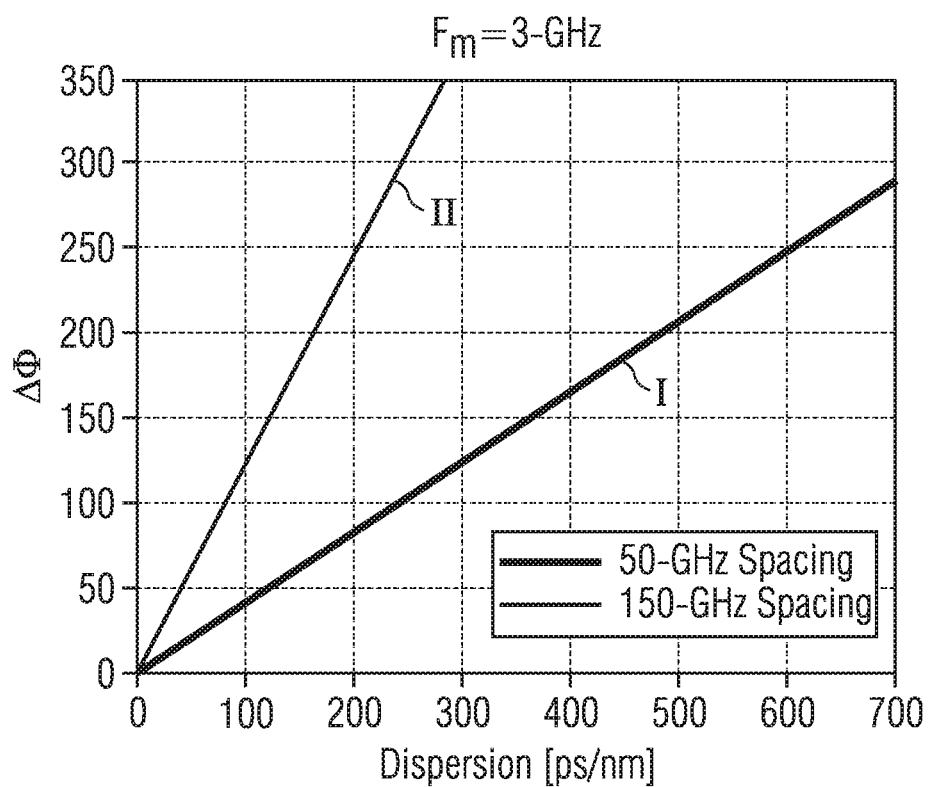

WAVELENGTH DIVISION MULTIPLEXED TELECOMMUNICATION SYSTEM WITH AUTOMATIC COMPENSATION OF CHROMATIC DISPERSION

FIELD OF THE INVENTION

The invention relates to a wavelength division multiplexed telecommunication system with automatic compensation of chromatic dispersion in a predetermined wavelength band and a corresponding method for compensating a chromatic dispersion in a predetermined wavelength band.

TECHNICAL BACKGROUND

In wavelength division multiplexed (WDM) telecommunication networks, signals are transported via optical fibers at different wavelengths within a wavelength band. Optical transceivers connected to an optical link are provided to transmit and receive optical signals. High-speed optical transceivers can use multi-level modulation formats and direct-detection receivers to offer high capacity transmission with low cost, reduced power consumption and low latency of the WDM system. Such transceivers are more vulnerable to chromatic dispersion (CD) related penalties than the common two-level (RZ or NRZ) amplitude modulation. Examples of such modulation formats being considered for transmission at high data rates (for instance 50 Gb/s or 100 Gb/s) are PAM4, DMT, and PAM8. These modulation formats require compensation of CD within tens of ps/nm to minimize any impact of CD on system performance determined by BER, Q factor, SNR, or other performance metrics. In conventional systems, precise chromatic dispersion estimation and compensation is cumbersome and inefficient for receivers with low chromatic dispersion tolerances. Accordingly, there is a need to provide a wavelength division multiplexed telecommunication system and a method for automatically compensating chromatic dispersion in a predetermined wavelength band minimizing residual chromatic dispersion efficiently and sufficiently even for a system with a very low chromatic dispersion tolerance.

SUMMARY OF THE INVENTION

The invention provides according to a first aspect a wavelength division multiplexed telecommunication system with automatic compensation of chromatic dispersion in a predetermined wavelength band,
the wavelength division multiplexed telecommunication system comprising
a probe signal detection unit at a receiver side adapted to detect amplitude modulated probe signals generated by a probe signal generation unit at a transmitter side with a predetermined relative phase difference and transmitted through an optical link to the receiver side; and
a chromatic dispersion compensation unit adapted to compensate the chromatic dispersion, in the full predetermined wavelength band, in response to a relative phase difference of the amplitude modulated probe signals detected by said probe signal detection unit at the receiver side.

In an embodiment of the wavelength division multiplexed telecommunication system according to the first aspect of the present invention, the chromatic dispersion compensation unit comprises a tunable dispersion compensation module. The tunable dispersion compensation module can be based on Gires-Tournois etalons, fiber Bragg grating, arrayed-waveguide grating or other technology.

In a possible embodiment of the wavelength division multiplexed telecommunication system according to the first aspect of the present invention, the tunable dispersion compensation module is tuned until a relative phase difference between the detected amplitude modulated probe signals is minimized.

In a possible embodiment of the wavelength division multiplexed telecommunication system according to the first aspect of the present invention, the probe signal generation unit is adapted to generate probe signals with the same modulation frequency and with the predetermined relative phase difference.

In a further possible embodiment of the wavelength division multiplexed telecommunication system according to the first aspect of the present invention, the amplitude modulated probe signals generated by said probe signal generation unit at the transmitter side comprise probe signal wavelengths surrounding the center of the predetermined wavelength band. These probe wavelengths can be modulated in possible embodiments using one of the following:
- Self modulated (or directly) lasers that are driven with sinusoidal signals
- External modulators that follow the laser sources, which are driven with sinusoidal signals
- One external modulator that simultaneously modulates the outputs of the laser sources after being combined via an optical coupler.

The probe signals can be generated by fixed wavelength lasers or by tunable wavelength lasers.

In a further possible embodiment of the wavelength division multiplexed telecommunication system according to the first aspect of the present invention, the tunable dispersion compensation module of said chromatic dispersion compensation unit is adapted to vary its chromatic dispersion setting until the amplitude modulated probe signals detected by said probe signal detection unit are in phase.

The goal is to get the relative phase shift at the receiver side equal to that at the predetermined relative phase difference at the transmitter side. This is the point when dispersion can be considered fully compensated.

In a further possible embodiment of the wavelength division multiplexed telecommunication system according to the first aspect of the present invention, the amplitude modulated probe signals generated by the probe signal generation unit are added by means of a passive coupler to the wavelength division multiplexed signals output from a WDM multiplexer and amplified by a booster amplifier at the transmitter side.

In a further possible embodiment of the wavelength division multiplexed telecommunication system according to the first aspect of the present invention, the amplitude modulated probe signals generated by said probe signal generation unit are added by means of a filter to wavelength division multiplexed signals output by a WDM multiplexer and amplified by a booster amplifier at the transmitter side.

In a still further possible alternative embodiment of the wavelength division multiplexed telecommunication system according to the first aspect of the present invention, the amplitude modulated probe signals generated by said probe signal generation unit are injected by means of a switch to a transmission line which transports wavelength division multiplexed signals output by a WDM multiplexer and amplified by a booster amplifier at the transmitter side.

The booster amplifier is typically an Erbium-doped fiber amplifier (EDFA) but can also be a Raman amplifier. A fixed dispersion-compensation module can be inserted at the input, in the mid-stage, or at the output of the booster amplifier to partially pre-compensate chromatic dispersion CD along the fiber link.

In a further possible embodiment of the wavelength division multiplexed telecommunication system according to the first aspect of the present invention, the booster amplifier at the transmitter side is connected via the optical link to a preamplifier at the receiver side adapted to amplify the received WDM signals and adapted to amplify the received amplitude modulated probe signals. The pre-amplifier can be an EDFA or a Raman amplifier.

In a still further possible embodiment of the wavelength division multiplexed telecommunication system according to the first aspect of the present invention, the preamplifier at the receiver side is connected to a WDM demultiplexer adapted to demultiplex the received WDM signals.

In a further possible embodiment of the wavelength division multiplexed telecommunication system according to the first aspect of the present invention, the transmitted amplitude modulated probe signals are extracted at the receiver side by means of a splitter at the output of the preamplifier or from one of the outputs of the WDM demultiplexer and supplied to said probe signal detection unit.

In a further possible alternative embodiment of the wavelength division multiplexed telecommunication system according to the first aspect of the present invention, the transmitted amplitude modulated probe signals are extracted at the receiver side by means of a filter at the output of the preamplifier or from one of the outputs of the WDM demultiplexer and supplied to said probe signal detection unit.

In a still further possible alternative embodiment of the wavelength division multiplexed telecommunication system according to the first aspect of the present invention, the transmitted amplitude modulated probe signals are extracted at the receiver side by means of a switch at the output of the preamplifier or from one of the outputs of the WDM demultiplexer and supplied to said probe signal detection unit. This can be done by fixed or tunable optical filters or by optical interleavers.

In a further possible embodiment of the wavelength division multiplexed telecommunication system according to the first aspect of the present invention, the probe signal detection unit comprises a phase comparator adapted to derive a relative phase difference between phases of extracted amplitude modulated probe signals and to communicate the derived relative phase difference to the chromatic dispersion compensation unit.

In a possible embodiment a processor receives the relative phase information and determines the adjustment which needs to be made on the tunable chromatic dispersion compensation unit.

In a still further possible embodiment of the wavelength division multiplexed telecommunication system according to the first aspect of the present invention, the probe signal detection unit comprises photo detectors adapted to detect extracted amplitude modulated probe signals and to generate corresponding electrical signals supplied to the phase comparator of said probe signal detection unit.

In a further possible embodiment of the wavelength division multiplexed telecommunication system according to the first aspect of the present invention, the probe signal detection unit comprises a balanced photo detector having an output voltage corresponding to the phase difference between the phases of amplitude modulated probe signals extracted at the receiver side.

In a further possible embodiment of the wavelength division multiplexed telecommunication system according to the first aspect of the present invention, the tunable, dispersion compensation module of the chromatic dispersion compensation unit is tuned until the output voltage of the balanced photo detector becomes minimal.

In a further possible embodiment of the wavelength division multiplexed telecommunication system according to the first aspect of the present invention, the wavelength of at least one amplitude modulated probe signal generated by said probe signal generation unit is tunable.

In a still further possible embodiment of the wavelength division multiplexed telecommunication system according to the first aspect of the present invention, the modulation frequency of the amplitude modulated probe signals generated by laser diodes of said probe signal generation unit is switchable to increase an accuracy of the chromatic dispersion compensation.

In a still further possible embodiment of the wavelength division multiplexed telecommunication system according to the first aspect of the present invention, a frequency spacing between probe signal wavelengths of the amplitude modulated probe signals generated by laser diodes of the probe signal generation unit is varied to trade off an accuracy of the chromatic dispersion compensation versus an estimation range.

In a still further possible embodiment of the wavelength division multiplexed telecommunication system according to the first aspect of the present invention, an optical supervisory channel is provided for communication between a first control unit adapted to control the probe signal generation unit at the transmitter side and a second control unit adapted to control the probe signal detection unit, and/or the chromatic dispersion compensation unit.

In a further possible embodiment of the wavelength division multiplexed telecommunication system according to the first aspect of the present invention, the optical link is a bidirectional optical transmission link comprising at least one optical fiber. The optical link can also include optical amplifiers and dispersion compensation modules.

In a further possible embodiment of the wavelength division multiplexed telecommunication system according to the first aspect of the present invention, the system is a dense wavelength division multiplexed system.

In a further possible embodiment of the wavelength division multiplexed telecommunication system according to the first aspect of the present invention, the predetermined wavelength band comprises a C-band.

In a further possible alternative embodiment of the wavelength division multiplexed telecommunication system according to the first aspect of the present invention, the predetermined wavelength band comprises an L-band.

In a still further possible alternative embodiment of the wavelength division multiplexed telecommunication system according to the first aspect of the present invention, the predetermined wavelength band comprises an S-band.

The invention further provides according to a second aspect a method for compensating a chromatic dispersion in a predetermined wavelength band,
the method comprising the steps of:
generating amplitude modulated probe signals with a predetermined relative phase difference at a transmitter side and transmitting the generated amplitude modulated probe signals through an optical link to a receiver side,
detecting at the receiver side a relative phase difference of the received amplitude modulated probe signals and compensating automatically the chromatic dispersion in response to the detected relative phase difference of the received amplitude modulated probe signals.

In a possible embodiment of the method according to the second aspect of the present invention, the amplitude modulated probe signals are generated by laser diodes with the same modulation frequency and comprise the predetermined relative phase difference.

In a further possible embodiment of the method according to the second aspect of the present invention, the received amplitude modulated probe signals are extracted at the receiver side and the relative phase difference between the phases of the extracted amplitude modulated probe signals is detected.

In a still further possible embodiment of the method according to the second aspect of the present invention, a chromatic dispersion setting of a tunable dispersion compensation module is varied until the relative phase difference between the phases of the extracted amplitude modulated probe signals becomes minimal.

In a still further possible embodiment of the method according to the second aspect of the present invention, the wavelength of at least one amplitude modulated probe signal is tuned to derive a sign of the chromatic dispersion and to calculate an average value of the estimated chromatic dispersion.

In a further possible embodiment of the method for compensating a chromatic dispersion according to the second aspect of the present invention, the modulation frequency of the amplitude modulated probe signals generated by the laser diodes at the transmitter side is changed to increase an accuracy of the chromatic dispersion compensation.

In a still further possible embodiment of the method for compensating a chromatic dispersion according to the second aspect of the present invention, a frequency spacing between probe signal wavelengths of the amplitude modulated probe signals generated by laser diodes at the transmitter side is varied to trade off an accuracy of the chromatic dispersion compensation against an estimation range.

The invention further provides according to a third aspect a line amplifier for amplifying signals received via an optical link, said line amplifier comprising a probe signal detection unit adapted to detect amplitude modulated probe signals received through said optical link and, a chromatic dispersion compensation unit adapted to compensate the chromatic dispersion in response to a detected relative phase difference of the received amplitude modulated probe signals.

The invention further provides according to a fourth aspect a transceiver card for a bidirectional optical transmission link of a wavelength division multiplexed telecommunication system, said transceiver card comprising a probe signal generation unit adapted to generate at least two amplitude modulated probe signals with a predetermined relative phase difference added to wavelength division multiplexed signals transmitted through said optical transmission link, a probe signal detection unit adapted to detect amplitude modulated probe signals received through said optical transmission link and a chromatic dispersion compensation unit adapted to compensate the chromatic dispersion in response to a detected relative phase difference of the received amplitude modulated probe signals.

In a possible embodiment of the transceiver card according to the fourth aspect of the present invention, the transceiver card comprises a booster amplifier adapted to amplify the generated amplitude modulated probe signals and the wavelength division multiplexed signals transmitted through said optical transmission link.

In a further possible embodiment of the transceiver card according to the fourth aspect of the present invention, the transceiver card comprises a preamplifier adapted to amplify the amplitude modulated probe signals and to amplify the wavelength division multiplexed signals received through said optical transmission link.

In a further possible embodiment of the transceiver card according to the fourth aspect of the present invention, the transceiver card comprises an optical WDM multiplexer adapted to multiplex WDM signals to the booster amplifier of the transceiver card.

In a further possible embodiment of the transceiver card according to the fourth aspect of the present invention, the transceiver card comprises an optical demultiplexer adapted to demultiplex WDM signals amplified by the preamplifier of the transceiver card.

BRIEF DESCRIPTION OF FIGURES

In the following, possible embodiments of the different aspects of the present invention are described in more detail with reference to the enclosed figures.

FIG. 9 demonstrates how a channel spacing between the probe signals can be used to trade off accuracy vs estimation range.

DETAILED DESCRIPTION OF EMBODIMENTS

Figure 1:
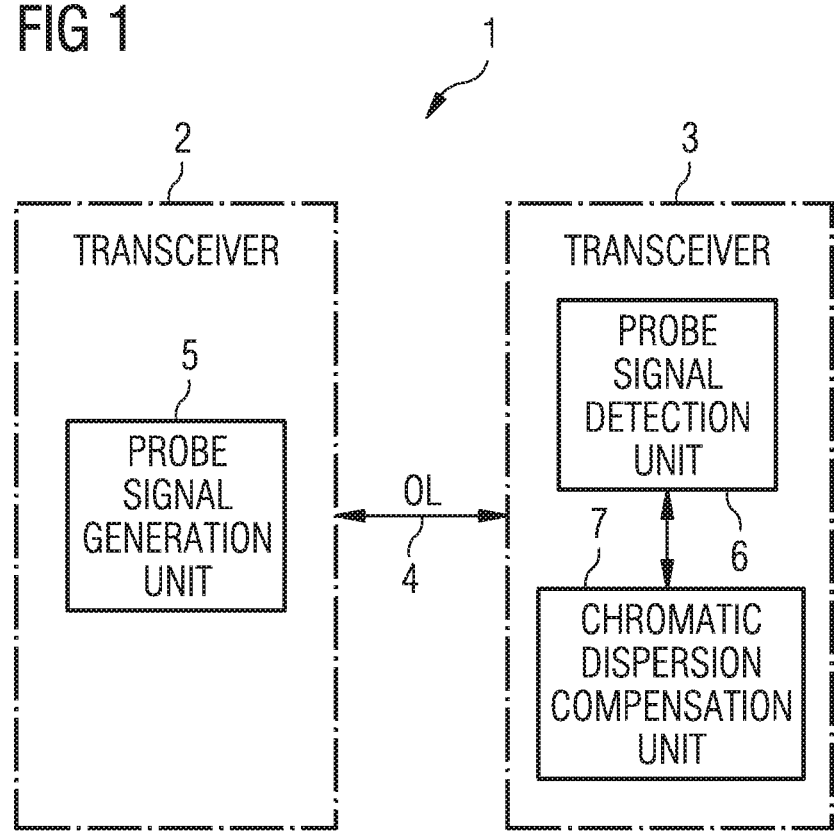
FIG. 1 shows a schematic block diagram for illustrating a possible embodiment of a wavelength division multiplexed telecommunication system according to the first aspect of the present invention.

FIG. 1 illustrates schematically a wavelength division multiplexed telecommunication system 1 according to a first aspect of the present invention. The wavelength division multiplexed telecommunication system 1 as shown in FIG. 1 provides automatic compensation of chromatic dispersion CD in a predetermined wavelength band. FIG. 1 shows a first transceiver 2 and a second transceiver 3 connected with each other by means of an optical link 4. The first transceiver 2 comprises a probe signal generation unit 5 connected to a probe signal detection unit 6 of the second transceiver 3 via the optical link 4. The optical link 4 comprises at least one optical fiber. The probe signal generation unit 5 at the transmitter side is adapted to generate amplitude modulated probe signals with a predetermined relative phase difference. The generated amplitude modulated probe signals are transmitted by the first transceiver 2 via the optical link 4 to the probe signal detection unit 6 of the second transceiver 3. The probe signal detection unit 6 at the receiver side is adapted to detect the amplitude modulated probe signals generated by the probe signal generation unit 5 at the transmitter side. As can be seen in FIG. 1, the second transceiver 3 at the receiver side comprises a chromatic dispersion compensation unit 7 adapted to compensate the chromatic dispersion CD in response to a relative phase difference of the amplitude modulated probe signals detected by the probe signal detection unit 6 at the receiver side of the optical link 4. In a possible embodiment, the probe signal generation unit 5 is adapted to generate probe signals with the same modulation frequency and with a predetermined relative phase difference.

These probe wavelengths can be modulated using one of the following:
- Self modulated (or directly) lasers that are driven with sinusoidal signals
- External modulators that follow the laser sources, which are driven with sinusoidal signals
- One external modulator that simultaneously modulates the outputs of the laser sources after being combined via an optical coupler.

Also a multi-wavelength laser source that is either directly modulated or followed by an external modulator. i.e. one laser source for both probe signals, can be used.

The amplitude modulated probe signals generated by the probe signal generation unit 5 at the transmitter side comprise probe signal wavelengths which can surround a center of a predetermined wavelength band. This wavelength band can comprise in a possible embodiments a C-band, an L-band or an S-band. The tunable dispersion compensation module TDCM of the chromatic dispersion compensation unit 7 is adapted to vary in a preferred embodiment its chromatic dispersion setting until the amplitude modulated probe signals detected by the probe signal detection unit 6 are back to the predetermined phase offset at the transmitter side.

A main advantage of the wavelength division multiplexed telecommunication system 1 illustrated in the schematic diagram of FIG. 1 is that chromatic dispersion contributions from the different transmission system components as well as the accumulated chromatic dispersion within the transmission fibers of the optical link 4 for all WDM channels transported via the optical link 4 are compensated at once.

A further advantage of the wavelength division multiplexed telecommunication system 1 as shown in FIG. 1 is that it allows for an optimal compensation of the chromatic dispersion CD without the need to precisely estimate the absolute value of the chromatic dispersion caused by the transmission system components and the transmission fibers.

Further, the chromatic dispersion within the wavelength division multiplexed telecommunication system 1 can be compensated at high speed when compared to other techniques requiring blindly sweeping the chromatic dispersion setting of a TDCM and then requiring a performance related feedback from the transceiver cards.

Compensating the chromatic dispersion CD without measuring its absolute value as performed in the wavelength division multiplexed telecommunication system 1 according to the first aspect of the present invention eliminates the need for complex and costly high precision and fully tunable optical components.

Figure 2:
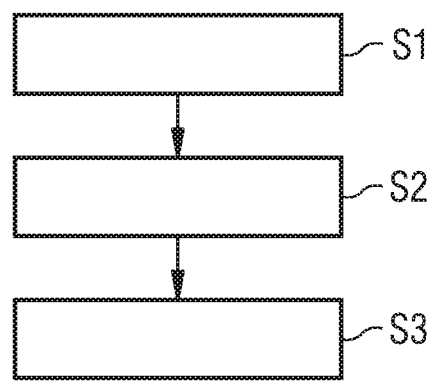
FIG. 2 shows a flowchart of a possible exemplary embodiment of a method for compensating a chromatic dispersion in a predetermined wavelength band according to the second aspect of the present invention.

FIG. 2 shows a flowchart of a possible exemplary embodiment of a method for compensating a chromatic dispersion CD in a predetermined wavelength band according to a further aspect of the present invention.

In a first step S1, amplitude modulated probe signals with a predetermined relative phase difference are generated at a transmitter side. The generated amplitude modulated probe signals are then transmitted through an optical link 4 to a receiver side.

In a further step S2, a relative phase difference of the received amplitude modulated probe signals is detected at the receiver side.

Finally, in step S3, the chromatic dispersion CD is compensated automatically in response to the detected relative phase difference of the received amplitude modulated probe signals.

In a possible embodiment, the amplitude modulated probe signals are generated in step S1 by laser diodes with the same modulation frequency and comprise the predetermined relative phase difference. In step S2, the received amplitude modulated probe signals are extracted at the receiver side and the relative phase difference between the phases of the extracted amplitude modulated probe signals is detected. In a possible embodiment, in step S3, a chromatic dispersion setting of a tunable dispersion compensation module TDCM is varied in step S3 until the relative phase difference between the phases of the extracted amplitude modulated probe signals becomes minimal.

In a possible embodiment, the wavelength 7 of at least one amplitude modulated probe signal is tuned to derive a sign of the chromatic dispersion CD and to calculate an average value of the estimated chromatic dispersion CD.

In a further possible embodiment of the method as illustrated in FIG. 2, the modulation frequency $F_m$ of the amplitude modulated probe signals generated by the laser diodes at the transmitter side in step S1 is changed to trade off an accuracy of the chromatic dispersion compensation against estimation range.

In a further possible embodiment, a frequency spacing between probe signal wavelengths of the amplitude modulated probe signals generated by laser diodes at the transmitter side is varied to trade off the accuracy of the chromatic dispersion compensation against estimation range.

Figure 3:
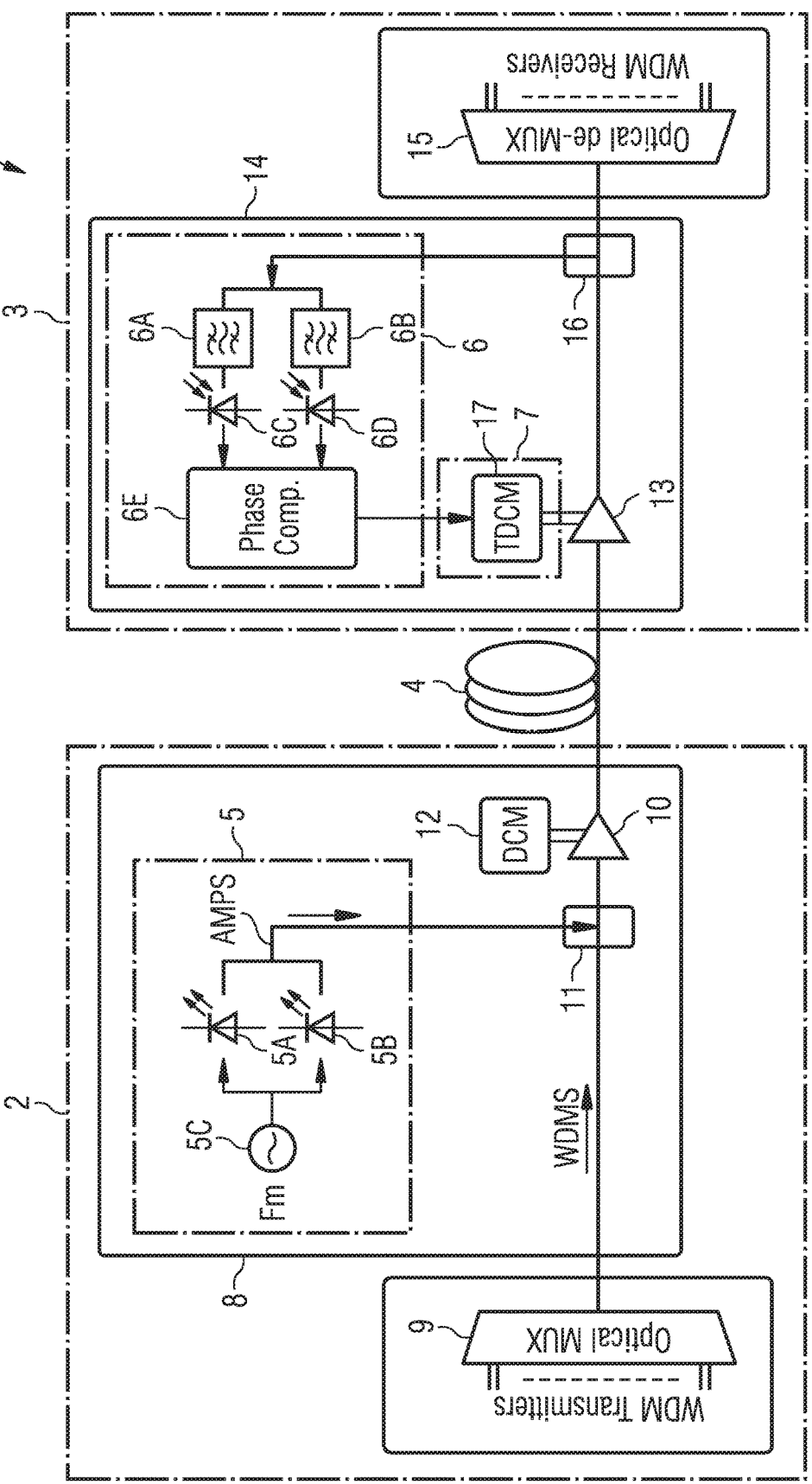
FIG. 3 shows a circuit diagram for illustrating a possible exemplary embodiment of a wavelength division multiplexed telecommunication system according to the first aspect of the present invention.

FIG. 3 illustrates a high-level block diagram of a possible embodiment of the wavelength division multiplexed telecommunication system 1 according to the first aspect of the present invention. In the illustrated embodiment, the first transceiver 2 is connected via an optical link 4 comprising a single mode fiber SMF to a second transceiver 3. The first transceiver 2 has a booster card 8 comprising the probe signal generation unit 5. The amplitude modulated probe signals AMPS generated by the probe signal generation unit 5 are added in the illustrated embodiment to wavelength division multiplexed signals WDMS output by an optical WDM multiplexer 9 and amplified by a booster amplifier 10 at the transmitter side. The amplitude modulated probe signals AMPS generated by the probe signal generation unit 5 can be added by means of a component 11 which can be formed by a passive coupler, a filter or a switch. In the illustrated embodiment of FIG. 3, the probe signal generation unit 5 implemented on the booster card 8 comprises two laser diodes 5A, 5B, which are amplitude modulated with sinusoidal signals generated by the same signal source 5C with a frequency $F_m$. The wavelengths $\lambda 1$, $\lambda 2$ of the two lasers 5A, 5B are in a preferred embodiment tunable and can surround a center wavelength of a predetermined wavelength band WB under consideration. For example, the wavelength band WB can comprise a C-band, an L-band or an S-band. In a possible embodiment, the booster amplifier 10 can comprise a not-tunable dispersion compensation module DCM 12 for pre-compensation.

Figure 4:
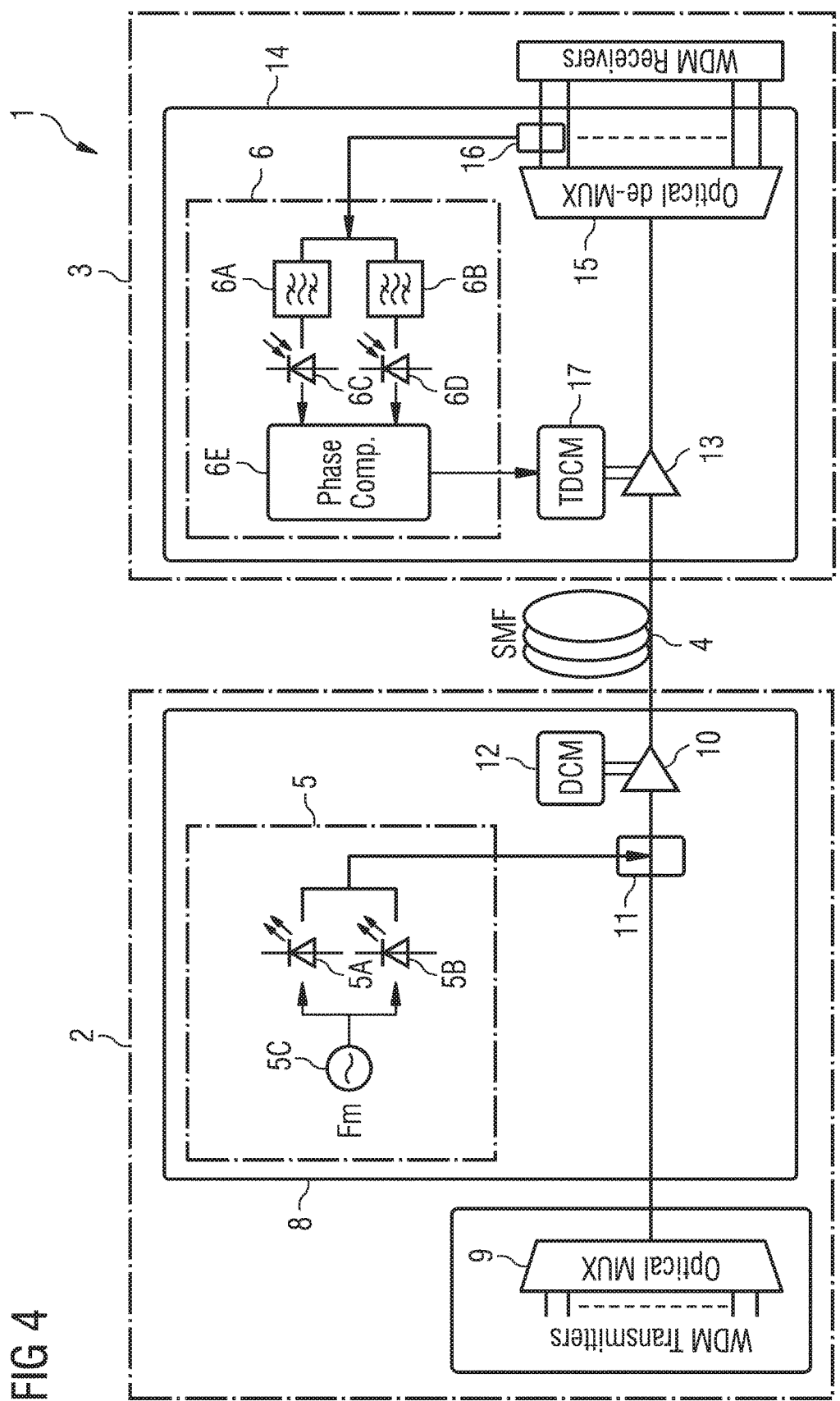
FIG. 4 shows a further schematic block diagram of a possible exemplary embodiment of a wavelength division multiplexed telecommunication system according to the first aspect of the present invention.

The optical multiplexer 9 receives at its input side signals from different transmitters at different wavelengths within the predetermined wavelength band. The amplitude modulated probe signals AMPS generated by the probe signal generation unit 5 are injected by means of a passive coupler, a filter or a switch 11 to the line transporting the wavelength division multiplexed signals WDMS output by the WDM multiplexer 9. The amplitude modulated probe signals AMPS and the WDM signals output by the WDM multiplexer 9 are then amplified by the booster amplifier 10 of the booster card 8. The output of the booster amplifier 10 is connected via the optical link 4 to a preamplifier 13 at the receiver side adapted to amplify the received WDM signals and the received amplitude modulated probe signals AMPS. The preamplifier 13 at the receiver side of the optical link 4 can be implemented on a pre-card 14 of the second transceiver 3 as illustrated in FIG. 3. The preamplifier 13 at the receiver side is connected to a WDM demultiplexer 15 adapted to demultiplex the received WDM signals. The transmitted amplitude modulated probe signals AMPS can be extracted at the receiver side by means of a component 16 which can be formed by a splitter, a filter or a switch at the output of the preamplifier 13. In an alternative embodiment as illustrated in FIG. 4, the transmitted amplitude modulated probe signals AMPS can also be extracted from one of the outputs of the WDM demultiplexer 15 and supplied to the probe signal detection unit 6 of the transceiver 3. In the embodiment illustrated in FIG. 3, the extracted amplitude modulated probe signals AMPS are supplied to the probe signal detection unit 6 which can be implemented on the pre-card 14 of the transmitter 3. The component 16 can be formed by a splitter, filter or a switch at the output of the preamplifier 13. In the embodiment illustrated in FIG. 3, the probe signal detection unit 6 comprises two fixed or tunable filters 6A, 6B which can be used to demultiplex the two wavelengths of the amplitude modulated probe signals AMPS and which may be extracted by a passive signal splitter. The demultiplexed amplitude modulated probe signals AMPS at the predetermined wavelengths of these probe signals are subsequently detected using photo diodes 6C, 6D of the probe signal detection unit 6.

In the electrical domain, the phases of the two sinusoidal signals detected by the photo detector 6C, 6D on the optical carriers are compared by a phase comparator 6E and communicated to a tunable dispersion compensation module TDCM 17 as illustrated in FIG. 3. Accordingly, the probe signal detection unit 6 in the illustrated embodiment comprises photo detectors 6C, 6D adapted to detect extracted amplitude modulated probe signals AMPS and to generate corresponding electrical signals supplied to the phase comparator 6E of the probe signal detection unit 6 which communicates the detected phase difference to the tunable dispersion compensation module 17. The tunable dispersion compensation module TDCM 17 forms part of the chromatic dispersion compensation unit 7 which is adapted to compensate the chromatic dispersion CD in response to the detected relative phase difference of the amplitude modulated probe signals AMPS detected by the probe signal detection unit 6. A processor can receive phase difference data and drive the TDCM and the probe signal transmitters. In a preferred embodiment, the tunable dispersion compensation module 17 of the chromatic dispersion compensation unit 7 is tuned until the relative phase difference between the detected amplitude modulated probe signals is minimized. In a possible embodiment, the tunable dispersion compensation module 17 of the chromatic dispersion compensation unit 7 is adapted to vary its chromatic dispersion setting until the amplitude modulated probe signals AMPS detected by the probe signal detection unit 6 are in phase. In a possible embodiment, the compensation dispersion setting of the TDCM 17 is varied while monitoring how the phase difference evolves until making sure that the two sinusoidal probe signals are in phase. In a possible implementation, an algorithm is used to bring the probe signals in place if the predetermined relative phase difference at the trans-multi side is zero. Otherwise the algorithm controls the TDCM 17 until the relative phase difference at the receiver side equals that at the transmitter side. This implies that the chromatic dispersion CD has been completely compensated. The tunable lasers and tunable optical filters are provided to monitor how the phase difference between two carriers changes while locally tuning their wavelengths. In a possible embodiment, the wavelength of at least one amplitude modulated probe signal AMPS is tuned to derive a sign of the chromatic dispersion CD and to calculate an average value of the estimated chromatic dispersion.

In a possible embodiment, a transceiver comprises both a booster card 8 and a pre-card 14 for bidirectional communication via an optical link 4 with another transceiver. Such a bidirectional transceiver card comprises a probe signal generation unit 5, a detection unit 6 and a chromatic compensation unit 7. According to a further aspect, the present invention provides a transceiver card for providing a bidirectional optical transmission link within a wavelength division multiplexed telecommunication system 1, wherein the transceiver card comprises a probe signal generation unit 5 adapted to generate at least two amplitude modulated probe signals AMPS with a predetermined relative phase difference added to wavelength division multiplexed signals WDMS transmitted through said optical transmission link 4, a probe signal detection unit 6 adapted to detect amplitude modulated probe signals AMPS received through said optical transmission link 4 and finally a chromatic dispersion compensation unit 7 adapted to compensate the chromatic dispersion CD in response to a detected relative phase difference of the received amplitude modulated probe signals AMPS. This transceiver card can comprise a booster amplifier 10 and a preamplifier 13. The booster amplifier 10 is adapted to amplify the generated amplitude modulated probe signals AMPS and the wavelength division multiplexed WDM signals transmitted through the optical transmission link 4. The preamplifier 13 of the transceiver card is adapted to amplify received amplitude modulated probe signals AMPS and to amplify the wavelength division multiplexed signals WDMS received through said optical transmission link 4.

Two integrated optical transceivers (i.e. optical transmitter and receiver integrated in the same module) can be used for generating the probe signals for one direction of the link and for detecting the probe signals from the other direction (i.e. in the case of a bi-directional link).

In a possible embodiment, a transceiver card can further comprise an optical WDM multiplexer adapted to multiplex WDM signals to the booster amplifier 10 and an optical WDM demultiplexer adapted to demultiplex WDM signals amplified by the preamplifier 13. Accordingly, the booster and preamplifier together with the probe signal generation unit 5, the probe signal detection unit 6 and the chromatic dispersion compensation unit 7 can be integrated in a possible embodiment into a single transceiver card to facilitate support of a bidirectional optical transmission link 4. In a possible embodiment, an optical supervisory channel, OSC, and filters can be integrated on the same transceiver card as well and can be used to communicate messages between the probe signal detection unit 6, the probe signal generation unit 5 and the chromatic dispersion compensation unit 7 at the two different ends of the optical link 4.

The TDCM can also be located in a possible embodiment on the booster card 8. In this embodiment the TDCM 17 can be controlled from a phase estimation stage at the receiver side via an Optical Supervisory Channel, OSC.

FIG. 4 illustrates a possible further exemplary embodiment for a wavelength division multiplexed telecommunication system 1 according to the first aspect of the present invention. In the illustrated embodiment, the transmitted amplitude modulated probe signals AMPS are extracted at the receiver side not at the output of the preamplifier 13 but from one of the outputs of the WDM demultiplexer 15. Accordingly, in a possible embodiment two probe signals at two different wavelengths carrying the sinusoidal signals are tapped from one of the outputs of the optical demultiplexer 15. Extracting the probe signals after the optical demultiplexer 15 has the advantage that also the chromatic dispersion contributions from all optical components on the signal path of the optical signal all the way to the receiver can be taken into account. In the illustrated configuration, the optical demultiplexer 15 can be integrated into the same preamplifier card 14 together with the optical preamplifier 13 as well as with the probe signal detection unit 6 and the chromatic dispersion compensation unit 7 comprising the TDCM module 17. Alternatively, the probe signals can be tapped out of an external optical demultiplexer and fed to a card of the transceiver 3 that contains the optical preamplifier 13, the probe signal detection unit 6 and the chromatic dispersion compensation unit 7.

Figure 5:
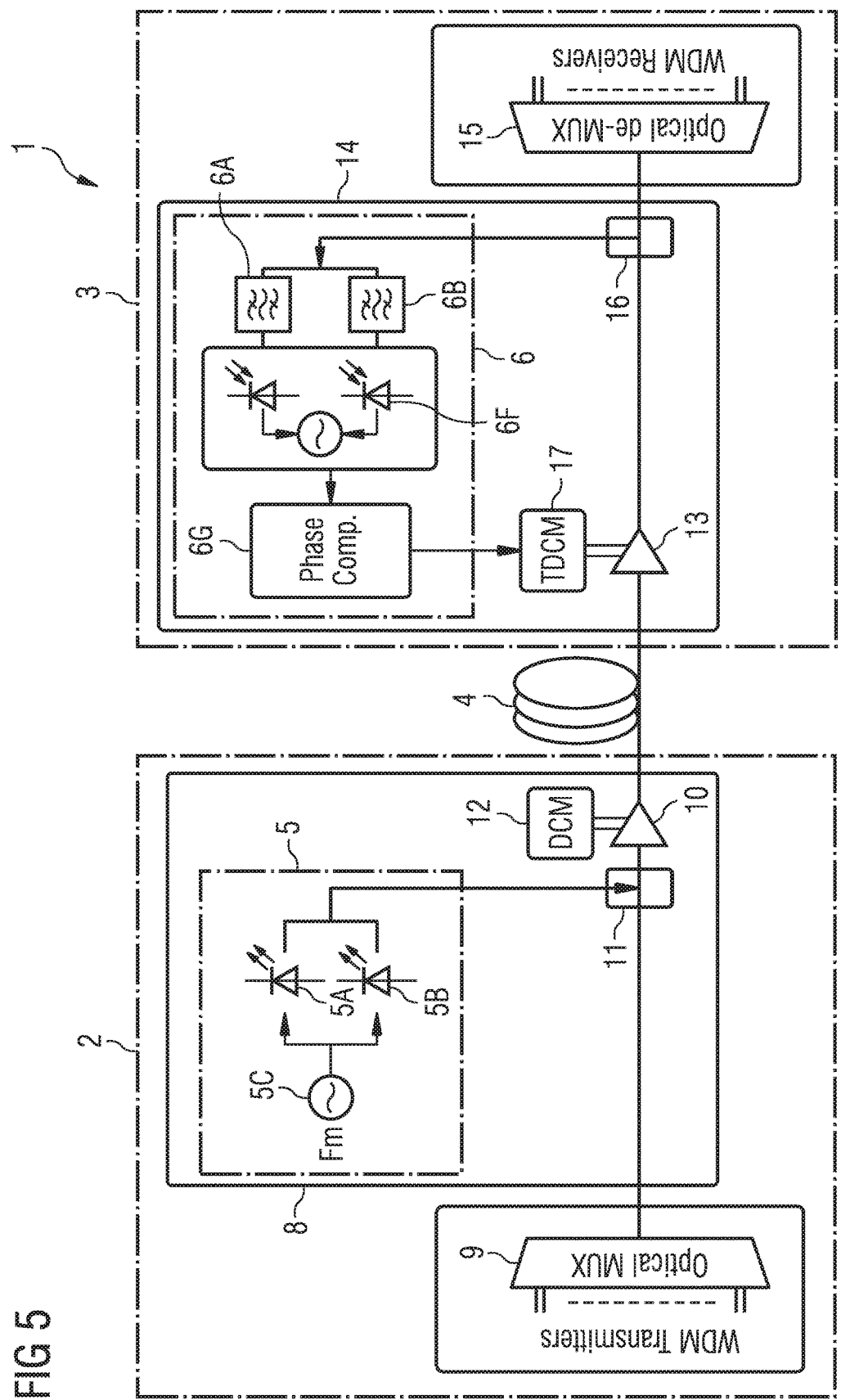
FIG. 5 shows a further schematic block diagram for illustrating a possible embodiment of a wavelength division multiplexed telecommunication system according to the first aspect of the present invention.

In the embodiment shown in FIG. 5, two photo detectors 6C, 6D, shown in the embodiment of FIG. 3, are replaced by a single balanced photo detector 6F. In the illustrated embodiment of FIG. 5, the probe signal detection unit 6 comprises the balanced photo detector 6F providing an output voltage corresponding to the phase difference between the phases of amplitude modulated probe signals AMPS extracted on the receiver side, for instance by means of a passive splitter or switch. A metering component 6G of the probe signal detection unit 6 meters the output voltage generated by the balanced photo detector 6F which corresponds to the phase difference between the phases of the amplitude modulated probe signals AMPS and supplies the measured voltage to the tunable dispersion compensation module 17 of the chromatic dispersion compensation unit 7. The output RMS voltage from the balanced PD corresponds to the phase difference between the two sinusoidal probe signals AMPS at the inputs of the probe signal detection unit 6. The TDCM 17 can be tuned in a closed loop configuration to reduce the output RMS voltage of the balanced photo detector 6F to make sure that the two sinusoidal probe signals AMPS are in phase which is the point when the output voltage becomes minimal.

Figure 6:
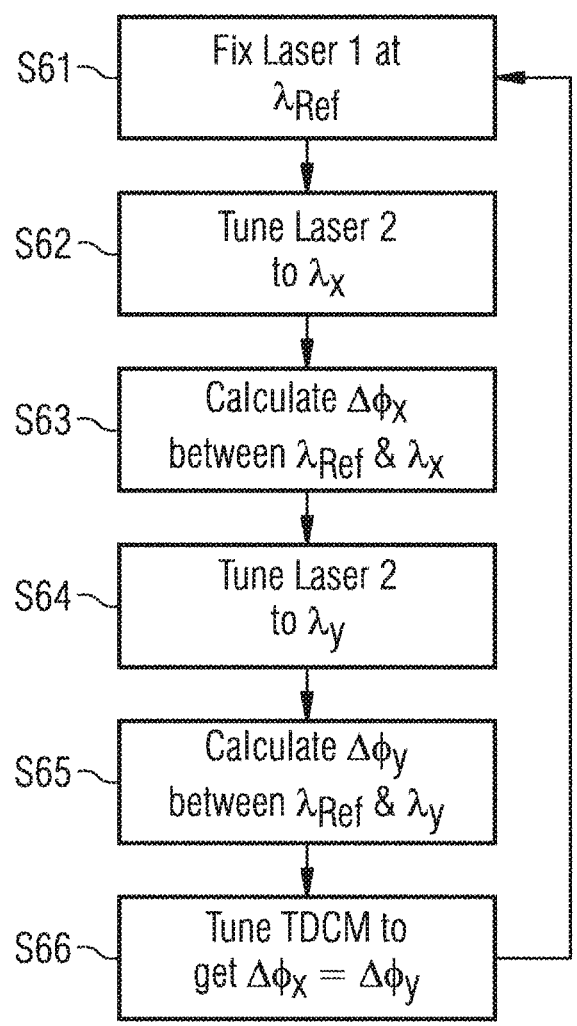
FIG. 6 shows a flowchart for illustrating a specific exemplary embodiment of the wavelength division multiplexed telecommunication system according to the first aspect of the present invention and the method for compensating a chromatic dispersion in a predetermined wavelength band according to the second aspect of the present invention.

The wavelength division multiplexed telecommunication system 1 according to the first aspect of the present invention can be simplified in a further possible embodiment as illustrated by the flow diagram of FIG. 6. In the illustrated scheme, the two tunable lasers or laser diodes at the transmitter side and the two precise narrow-band tunable filters at the receiver side can be replaced by one fixed and one tunable laser and one fixed and one tunable wide-band filter thus reducing the complexity of the WDM telecommunication system 1. In the illustrated system variant, the goal is to minimize the variations in the phase difference between sinusoidal probe signals on the fixed and tunable lasers, while tuning the wavelength of the tunable laser.

In the system variant as illustrated in FIG. 6, it is monitored how the phase difference evolves while varying the wavelength spacing. The technique performed in FIG. 6 allows for a wide separation between the wavelengths of the two laser diodes which consequently allows for the use of cost-effective wide-band tunable filters. In other words, the phase difference between the sinusoidal amplitude modulated probe signals AMPS on the fixed wavelength and the tunable wavelength can exceed $2\pi$ which translates into allowing a larger wavelength difference while the increase in this phase difference during tuning the wavelength of the tunable laser diode should not be more than $\pi$.

As shown in the flowchart of FIG. 6 in a first step S61, a first laser diode 1 provides a first amplitude modulated probe signal $AMPS_1$ at a fixed reference wavelength $\lambda_{ref}$. In a further step S62, the wavelength of the other amplitude modulated probe signal $AMPS_2$ generated by a second laser diode of the probe signal generation unit 5 is tuned to a wavelength $\lambda_x$. In a further step S63, the phase difference between the received amplitude modulated probe signals $AMPS_1$, $AMPS_2$ is calculated at the receiver side in step S63. In a further step S64, the second tunable laser diode providing the second probe signal is tuned to another wavelength $\lambda_y$. Then, in a further step S65, the phase difference between the probe signal at the reference wavelength $\lambda_{ref}$ and the probe signal at the tuned wavelength $\Delta_y$ is calculated. Finally, in step S66, the tunable dispersion compensation module is tuned until the phase difference $\Delta\Phi_x$ is equal to the calculated phase difference $\Delta\Phi_y$. Steps S61 and S64 can be iterated to improve the accuracy of the chromatic dispersion compensation.

Figure 7:
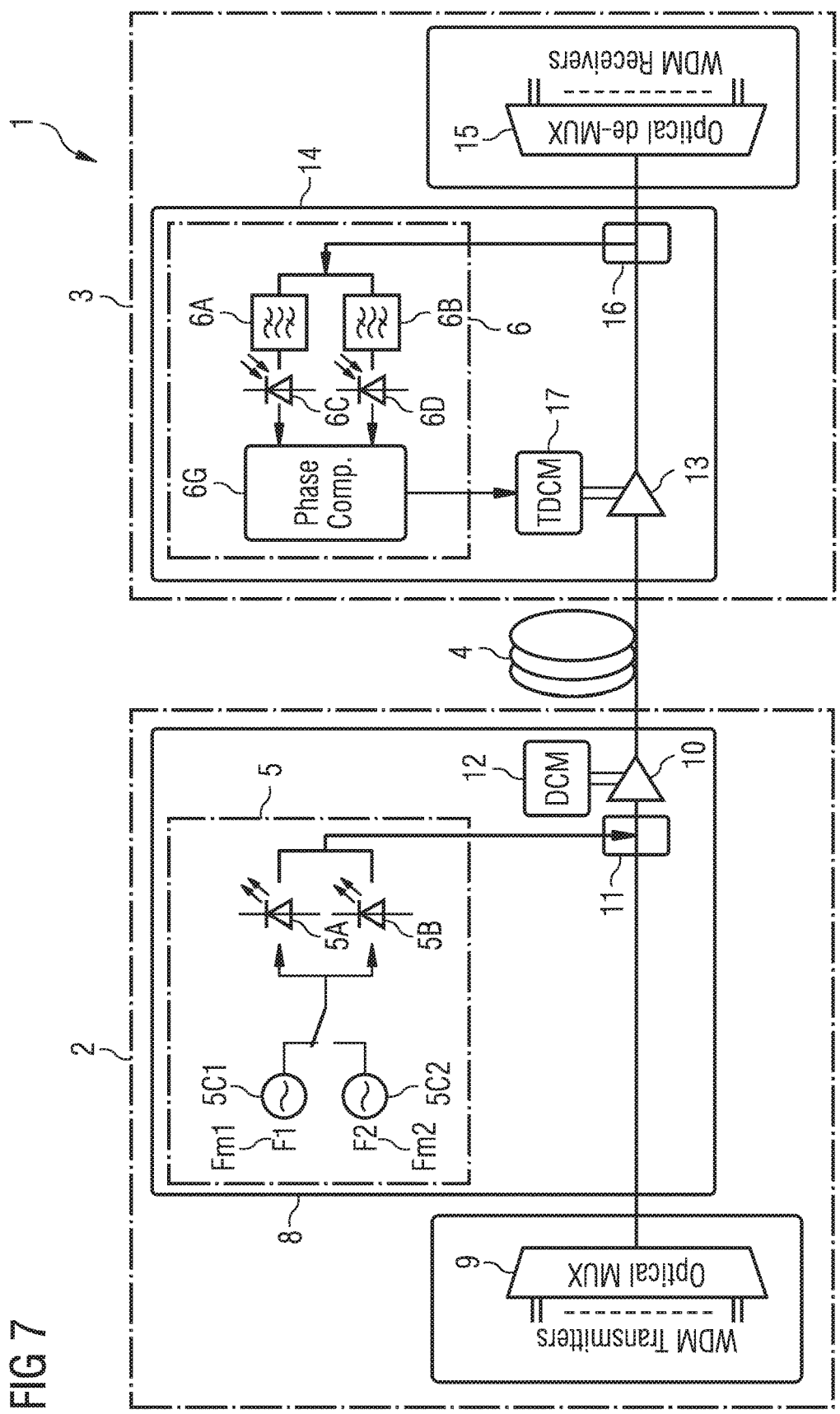
FIG. 7 shows a further schematic diagram for illustrating a possible exemplary embodiment of a wavelength division multiplexed telecommunication system according to the first aspect of the present invention.

FIG. 7 shows a further exemplary embodiment of a wavelength division multiplexed telecommunication system 1 according to an aspect of the present invention. The illustrated embodiment allows to simultaneously increase the chromatic dispersion compensation range and to improve the chromatic dispersion accuracy. In the illustrated embodiment, two different modulation frequencies $F_{m1}$, $F_{m2}$ are employed. Signal sources 5C1, 5C2 of the probe signal generation unit 5 generate two different modulation frequencies Fm1, Fm2. Using a lower modulation frequency at the beginning of the chromatic dispersion compensation process allows for a wider chromatic dispersion range which can be used for bulk chromatic dispersion compensation. Switching in a further step to a higher modulation frequency allows for a more accurate chromatic dispersion compensation which can be used for fine chromatic dispersion compensation. A more accurate chromatic dispersion compensation than the same amount of chromatic dispersion does result in a much larger phase shift compared to the first step where the lower modulation frequency is employed.

Figure 8A:
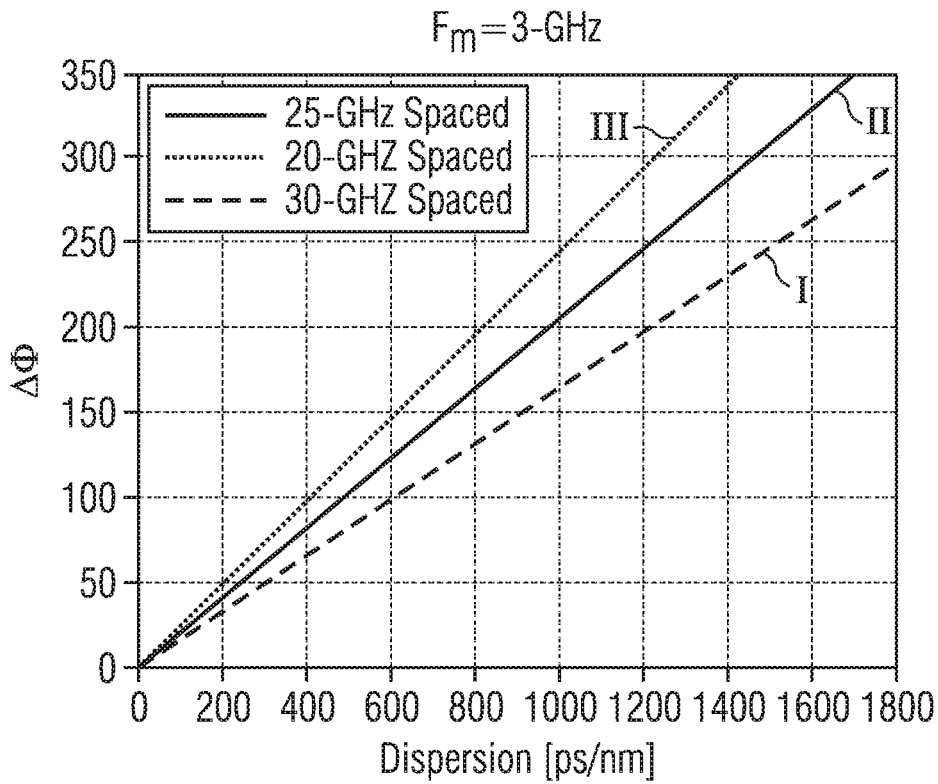
FIGS. 8A, 8B show the relationship between the accumulated chromatic dispersion and the resulting phase difference between the two carriers.
Figure 8B:
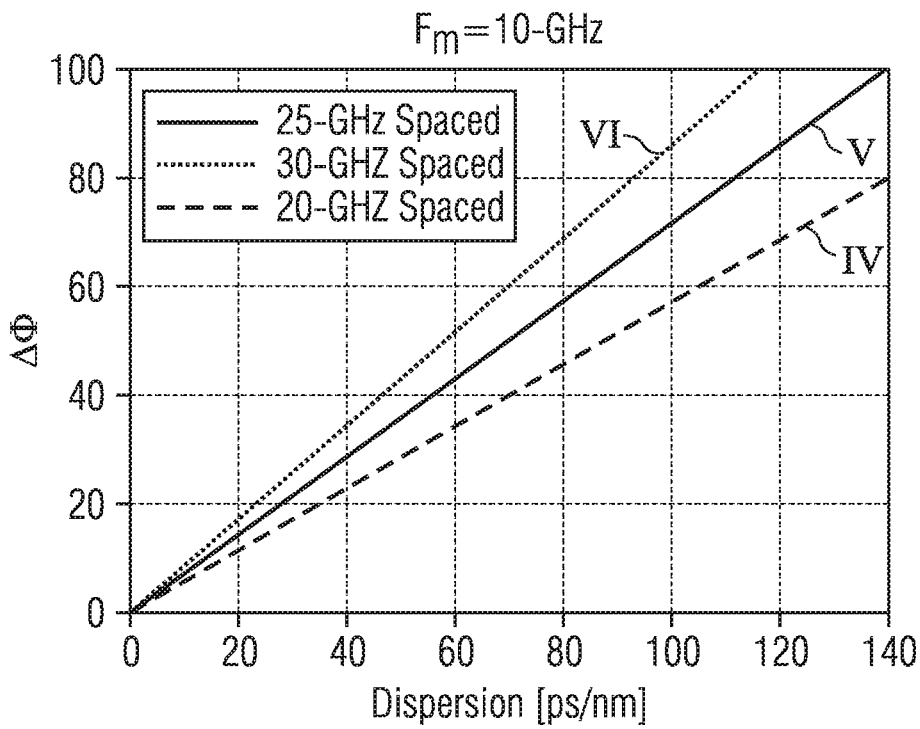

FIGS. 8A, 8B show diagrams for illustrating the operation of a WDM telecommunication system 1 according to a possible embodiment of the present invention. FIG. 8A illustrates a phase difference ΔΦ as a function of the chromatic dispersion CD for different spaced optical carriers. Curve I illustrates the phase difference for 20 GHz spaced carriers, curve II illustrates the phase difference for 25 GHz spaced optical carriers and curve III illustrates the phase difference for GHz spaced carriers. FIG. 8A illustrates the phase difference for different spaced optical carriers as a function of the chromatic dispersion for a modulation frequency $F_m$=3 GHz. This low modulation frequency allows for a coarse adjustment of the tunable dispersion chromatic module TDCM in a first stage of the compensation process. After the bulk chromatic dispersion compensation has been achieved the probe signal unit 5 is switched in a possible embodiment to a higher modulation frequency $F_m$ having for instance 10 GHz.

FIG. 8B shows the phase difference as a function of the chromatic dispersion CD for different spaced optical carriers. Curve IV illustrates the phase difference for 20 GHz spaced carriers, curve V illustrates the phase difference for 25 GHz spaced carriers and curve VI illustrates the phase difference for 30 GHz spaced carriers. As can be seen in FIGS. 8A, 8B, the closer the residual chromatic dispersion is to 0, the less effect the wavelength uncertainty has on the chromatic dispersion compensation which highlights the importance of compensating the chromatic dispersion CD iteratively.

In the embodiment illustrated in FIG. 7, the modulation frequency $F_m$ of the amplitude modulated probe signals AMPS generated by the laser diodes of the probe signal generation unit 5 is switchable to increase the accuracy of the chromatic dispersion compensation. For instance, the modulation frequency of the amplitude modulated probe signals AMPS generated by the laser diodes is switched from a modulation frequency $F_m$=3 GHz, as illustrated in the diagram of FIG. 8A, to a higher modulation frequency $F_m$=10 GHz, as illustrated by the diagram of FIG. 8B.

In a further possible alternative embodiment of the WDM telecommunication system 1 according to the present invention, wavelength spacing between probe signal wavelengths of the amplitude modulated probe signals AMPS generated by the laser diodes of the probe signal generation unit 5 is varied to increase an accuracy of the chromatic dispersion compensation as illustrated in context with FIG. 9. showing a technique where, the wavelength spacing between two optical carriers is varied in two or more steps. In the example illustrated by FIG. 9, the wavelength spacing between optical carriers is set to 50 GHz in a first step to compensate a bulk chromatic dispersion. FIG. 9 shows the phase difference as a function of the chromatic dispersion CD for different wavelength spacings. Curve I of FIG. 9 illustrates the dependence of the phase difference for a 50 GHz wavelength spacing while curve II illustrates the phase difference for a 150 GHz wavelength spacing. According to a possible embodiment, the wavelength spacing between carriers is first set to 50 GHz to compensate for a bulk chromatic dispersion. In a second step, the frequency spacing or channel spacing is increased up to 150 GHz using lasers with limited tunability to perform a fine compensation of the residual chromatic dispersion CD within the system.

In a further possible embodiment of the wavelength division multiplexed telecommunication system 1 according to the present invention, a channel OSC is provided for communication between a first control unit at the transmitter side adapted to control the probe signal generation unit 5 and a second control unit at the receiver side adapted to control the probe signal detection unit 6 and/or the chromatic dispersion compensation unit 7. The chromatic dispersion communication unit can be located at the receiver side but also on the transmitter side. In a possible embodiment a TDCM of the chromatic dispersion compensation unit 7 can be controlled by the probe space detector unit 6 with an OSC channel. In a possible embodiment, the wavelength division multiplexed system 1 according to the first aspect of the present invention is a dense wavelength division multiplexed system DWDM. Transceivers 2, 3 of the telecommunication system 1 can use in a possible embodiment multi-level modulation formats such as PAM4 and DMT which are vulnerable to chromatic dispersion CD related penalties. The system according to the present invention provides a very accurate chromatic dispersion compensation taking into account even the chromatic dispersion contributions from different optical system components such as Erbium-doped fibers in the EDFAs. The wavelength division multiplexed telecommunication system 1 solves the chromatic dispersion tolerance problem of high-speed direct-detect transceivers using a low complexity and low-cost automatic chromatic dispersion compensation stage that can be integrated into the WDM telecommunication system 1 which can take into account a full spectrum of a certain predetermined wavelength band. The WDM telecommunication system allows to integrate the chromatic dispersion compensation unit 7 inside one of the optical system elements that is located as close as possible to the optical receivers but before the WDM demultiplexer at the receiver side.

In a possible embodiment, the chromatic dispersion compensation unit 7 can be integrated in a line amplifier at the receiver side. The invention provides according to a further aspect a line amplifier for amplifying signals received via an optical link. The line amplifier comprises a probe signal detection unit 6 adapted to detect amplitude modulated probe signals received through an optical link 4 and an integrated chromatic dispersion compensation unit 7 adapted to compensate the chromatic dispersion in response to a detected relative phase difference of the received amplitude modulated probe signals AMPS. In a possible embodiment, the line amplifier can be formed by a preamplifier 13 of a transceiver 2 at the receiver side of an optical link 4.

With the wavelength division multiplexed system 1 according to the present invention instead of measuring a precise absolute value for chromatic dispersion CD and then to compensate for this measured value, the chromatic dispersion compensation as performed by the WDM system 1 according to the present invention is based on a differential phase estimation technique together with a TDCM to iteratively set the accumulated chromatic dispersion at the center of an optical spectrum to 0. This can be achieved by monitoring how the phase difference between the sinusoidal probe signals AMPS on the two optical carriers evolves while varying the chromatic dispersion setting of the tunable dispersion compensation module TDCM. The method and apparatus according to the present invention allows for an automatic compensation of chromatic dispersion simultaneously on multiple wavelengths. The probe signals can be transmitted through the same fibers of an optical link. The method according to the present invention takes care in a possible embodiment of the whole WDM spectrum within a predetermined wavelength band WB. In a possible embodiment, the chromatic dispersion measurement can be integrated with an amplifier and tunable chromatic dispersion compensation can be provided for end-to-end chromatic dispersion compensation across a DWDM link. In a possible embodiment, the relative phase between two modulated wavelengths can be measured and the chromatic dispersion can be compensated in a closed loop without the need for a precise chromatic dispersion estimation. A possible setup can use balanced photo diodes to detect a relative phase shift of two modulated wavelengths for measuring a maximum current or voltage. In a further simplified setup, it is possible to use one fixed and one tunable wavelength laser and to measure the difference in relative phase between tunable and fixed laser at the different wavelength settings of the tunable laser. In a possible embodiment, a chromatic dispersion compensation control loop can be provided using adjustment of wavelength spacing between the two modulated wavelengths to shift chromatic dispersion estimation from a high chromatic dispersion range with low resolution to a low chromatic dispersion range with high resolution. For the same purpose, a modulation frequency can be changed.

The invention claimed is:

1. A wavelength division multiplexed (WDM) telecommunication system with automatic compensation of chromatic dispersion in a predetermined wavelength band, said WDM telecommunication system comprising:
   a) a probe signal detection unit at a receiver side adapted to detect amplitude modulated probe signals having respective probe signal wavelengths generated by a probe signal generation unit at a transmitter side with a predetermined relative phase difference based on a switchable modulation frequency before being transmitted through an optical link to said receiver side, wherein a wavelength spacing between the probe signal wavelengths is variable; and
   b) a chromatic dispersion compensation unit, comprising a tunable dispersion compensation module comprising an algorithm, wherein said tunable dispersion compensation module is adapted to execute said algorithm to completely compensate the chromatic dispersion in response to a relative phase difference of the amplitude modulated probe signals detected by said probe signal detection unit at the receiver side until the relative phase difference at the receiver side equals that at the transmitter side;
   c) wherein said probe signal generation unit is adapted to generate probe signals with equal modulation frequency and with the predetermined relative phase difference; and
   d) wherein the algorithm, in order to make the relative phase difference at the receiver side equal that at the transmitter side, carries out the following steps S61-S66:
      in a first step S61: a first laser diode provides a first amplitude modulated probe signal, AMPS$_1$, at a fixed reference wavelength $\lambda_{ref}$;
      in a further step S62, the wavelength of the other amplitude modulated probe signal, AMPS$_2$, generated by a second laser diode of the probe signal generation unit is tuned to a wavelength $\lambda_x$;
      in a further step S63, the phase difference $\Delta\phi_x$ between the received amplitude modulated probe signals AMPS$_1$, AMPS$_2$ is calculated at the receiver side;
      in a further step S64, the second laser diode providing the second probe signal is tuned to another wavelength $\lambda_y$;
      then, in a further step S65, the phase difference $\Delta\phi_y$ between the probe signal at the reference wavelength $\lambda_{ref}$ and the probe signal at the tuned wavelength $\lambda_y$ is calculated; and
      in step S66, the tunable dispersion compensation module is tuned until the phase difference $\Delta\phi_x$ is equal to the calculated phase difference $\Delta\phi_y$; wherein
      steps S61 and S64 are iterated to improve the accuracy of the chromatic dispersion compensation.

2. The WDM telecommunication system according to claim 1, wherein the amplitude modulated probe signals generated by said probe signal generation unit at the transmitter side comprise probe signal wavelengths surrounding the center of the predetermined wavelength band.

3. The WDM telecommunication system according to claim 1, wherein the tunable dispersion compensation module of said chromatic dispersion compensation unit is adapted to vary its chromatic dispersion setting until the amplitude modulated probe signals detected by said probe signal detection unit are in phase.

4. The WDM telecommunication system according to claim 1, wherein the amplitude modulated probe signals generated by said probe signal generation unit are injected by means of a passive coupler, a filter or a switch to a line transporting wavelength division multiplexed, WDM, signals output by a WDM multiplexer and amplified by a booster amplifier at the transmitter side.

5. The WDM telecommunication system according to claim 4, wherein the booster amplifier at the transmitter side is connected via said optical link to a preamplifier at the receiver side adapted to amplify the received WDM signals and adapted to amplify the amplitude modulated probe signals.

6. The WDM telecommunication system according to claim 5, wherein the preamplifier at the receiver side is connected to a WDM demultiplexer adapted to demultiplex the received WDM signals.

7. The WDM telecommunication system according to claim 6, wherein the transmitted amplitude modulated probe signals are extracted at the receiver side by means of a splitter, filter or a switch at the output of the preamplifier or from one of the outputs of the WDM demultiplexer and supplied to said probe signal detection unit.

8. The WDM telecommunication system according to claim 1, wherein said probe signal detection unit comprises a phase comparator adapted to derive a relative phase difference between phases of extracted amplitude modulated probe signals and to communicate the derived relative phase difference to said chromatic dispersion compensation unit.

9. The WDM telecommunication system according to claim 8, wherein said probe signal detection unit comprises photo detectors adapted to detect extracted amplitude modulated probe signals and to generate corresponding electrical signals supplied to the phase comparator of said probe signal detection unit.

10. The WDM telecommunication system according to claim 1, wherein said probe signal detection unit comprises a balanced photo detector having an output voltage corresponding to the phase difference between the phases of amplitude modulated probe signals extracted at the receiver side.

11. The WDM telecommunication system according to claim 10, wherein said tunable dispersion compensation module of the chromatic dispersion compensation unit is tuned until the output voltage of the balanced photo detector becomes minimal.

12. The WDM telecommunication system according to claim 1, wherein a wavelength of at least one amplitude modulated probe signal generated by said probe signal generation unit is tunable.

13. The WDM telecommunication system according to claim 1, wherein the modulation frequency of the amplitude modulated probe signals generated by laser diodes of said probe signal generation unit is switchable to increase an accuracy of the chromatic dispersion compensation.

14. The WDM telecommunication system according to claim 1, wherein a frequency spacing between probe signal wavelengths of the amplitude modulated probe signals generated by laser diodes of said probe signal generation unit is varied to increase an accuracy of the chromatic dispersion compensation.

15. The WDM telecommunication system according to claim 1, wherein an optical supervisory channel (OSC) is provided for communication between a first control unit adapted to control the probe signal generation unit at the transmitter side and a second control unit adapted to control the probe signal detection unit, and/or the chromatic dispersion compensation unit.

16. The WDM telecommunication system according to claim 1, wherein said optical link is a bidirectional optical transmission link comprising at least one optical fiber.

17. The WDM telecommunication system according to claim 1, wherein said system is a dense wavelength division multiplexed system (DWDM).

18. The WDM telecommunication system according to claim 1, wherein said predetermined wavelength band comprises a C-band, an L-band or an S-band.

19. The WDM telecommunication system according to claim 1, wherein the WDM telecommunication system comprises a 100 Gb/sec direct detect WDM system using multilevel modulation formats comprising PAM4, PAM8 or DMT.

20. A method for compensating a chromatic dispersion in a predetermined wavelength band, the method comprising the steps of:
    (a) generating amplitude modulated probe signals having respective probe signal wavelengths with a predetermined relative phase difference at a transmitter side based on a switchable modulation frequency and transmitting the generated amplitude modulated probe signals through an optical link to a receiver side, wherein a wavelength spacing between the probe signal wavelengths is variable;
    (b) detecting at the receiver side a relative phase difference of the received amplitude modulated probe signals; and
    (c) controlling via an algorithm a tunable compensation module and completely compensating automatically the chromatic dispersion in response to the detected relative phase difference of the received amplitude modulated probe signals until the relative phase difference at the receiver side equals that at the transmitter side;
    (d) wherein the amplitude modulated probe signals are generated by laser diodes having equal modulation frequency and comprise the predetermined relative phase difference;
    (e) wherein said probe signal generation unit is adapted to generate probe signals with equal modulation frequency and with the predetermined relative phase difference; and
    (f) wherein the algorithm, in order to make the relative phase difference at the receiver side equal that at the transmitter side, carries out the following steps S61-S66;
    in a first step S61: a first laser diode provides a first amplitude modulated probe signal, $AMPS_1$, at a fixed reference wavelength $\lambda_{ref}$;
    in a further step S62, the wavelength of the other amplitude modulated probe signal, $AMPS_2$, generated by a second laser diode of the probe signal generation unit is tuned to a wavelength $\lambda_x$;
    in a further step S63, the phase difference $\Delta\phi_x$ between the received amplitude modulated probe signals AMPS1, AMPS2 is calculated at the receiver side;
    in a further step S64, the second laser diode providing the second probe signal is tuned to another wavelength $\lambda_y$;
    then, in a further step S65, the phase difference $\Delta\phi_y$ between the probe signal at the reference wavelength $\lambda_{ref}$ and the probe signal at the tuned wavelength $\lambda_y$ is calculated; and
    in step S66, the tunable dispersion compensation module is tuned until the phase difference $\Delta\phi_x$ is equal to the calculated phase difference $\Delta\phi_y$; wherein
    steps S61 and S64 are iterated to improve the accuracy of the chromatic dispersion compensation.

21. The method according to claim 20, wherein the received amplitude modulated probe signals are extracted at the receiver side and the relative phase difference between the phases of the extracted amplitude modulated probe signals is detected.

22. The method according to claim 21, wherein a chromatic dispersion setting of the tunable dispersion compensation module is varied until the relative phase difference between the phases of the extracted amplitude modulated probe signals is minimal.

23. The method according to claim 20, wherein a wavelength of at least one amplitude modulated probe signal is tuned to derive a sign of the chromatic dispersion and to calculate an average value of an estimated chromatic dispersion.

24. The method according to claim 20, wherein a modulation frequency of the amplitude modulated probe signals generated by laser diodes at the transmitter side is changed to increase an accuracy of the chromatic dispersion compensation.

25. The method according to claim 20, wherein a frequency spacing between probe signal wavelengths of the amplitude modulated probe signals generated by laser diodes at the transmitter side is varied to increase an accuracy of the chromatic dispersion compensation.

26. A line amplifier for amplifying signals received via an optical link, said line amplifier comprising:
    a probe signal detection unit adapted to detect amplitude modulated probe signals having respective probe signal wavelengths generated by a probe signal generation unit at a transmitter side with a predetermined relative phase difference based on a switchable same modulation frequency and received through said optical link, wherein a wavelength spacing between the probe signal wavelengths is variable; and a chromatic dispersion compensation unit, comprising a tunable dispersion compensation module comprising an algorithm, wherein said tunable dispersion compensation module is adapted to execute said algorithm to completely compensate for a chromatic dispersion in response to a detected relative phase difference of the received amplitude modulated probe signals until the relative phase difference at the receiver side equals that at the transmitter side: and wherein the algorithm, in order to make the relative phase difference at the receiver side equal that at the transmitter side, carries out the following steps S61-S66:

in a first step S61: a first laser diode provides a first amplitude modulated probe signal, $AMPS_1$, at a fixed reference wavelength $\lambda_{ref}$;

in a further step S62, the wavelength of the other amplitude modulated probe signal, $AMPS_2$, generated by a second laser diode of the probe signal generation unit is tuned to a wavelength $\lambda_x$;

in a further step S63, the phase difference $\Delta\phi_x$ between the received amplitude modulated probe signals $AMPS_1$, $AMPS_2$ is calculated at the receiver side;

in a further step S64, the second laser diode providing the second probe signal is tuned to another wavelength $\lambda_y$: then, in a further step S65, the phase difference $\Delta\phi_y$ between the probe signal at the reference wavelength $\lambda_{ref}$ and the probe signal at the tuned wavelength $\lambda_y$ is calculated; and in step S66, the tunable dispersion compensation module is tuned until the phase difference $\Delta\phi_x$ is equal to the calculated phase difference $\Delta\phi_y$; wherein steps S61 and S64 are iterated to improve the accuracy of the chromatic dispersion compensation.

27. A transceiver card for a bidirectional optical transmission link of a wavelength division multiplexed (WDM) telecommunication system, said transceiver card comprising:

a probe signal generation unit adapted to generate at least two amplitude modulated probe signals having respective probe signal wavelengths with a predetermined relative phase difference added to wavelength division multiplexed, WDM, signals transmitted through said optical transmission link based on a switchable same modulation frequency, wherein a wavelength spacing between the probe signal wavelengths is variable, a probe signal detection unit adapted to detect amplitude modulated probe signals received through said optical transmission link, and a chromatic dispersion compensation unit, comprising a tunable dispersion compensation module comprising an algorithm, wherein said tunable dispersion compensation module is adapted to execute said algorithm to completely compensate for a chromatic dispersion in response to a detected relative phase difference of the received amplitude modulated probe signals until the relative phase difference at the receiver side equals that at the transmitter side; and wherein the algorithm, in order to make the relative phase difference at the receiver side equal that at the transmitter side, carries out the following steps S61-S66;

in a first step S61: a first laser diode provides a first amplitude modulated probe signal, $AMPS_1$, at a fixed reference wavelength $\lambda_{ref}$;

in a further step S62, the wavelength of the other amplitude modulated probe signal, AMPS2, generated by a second laser diode of the probe signal generation unit is tuned to a wavelength $\lambda_x$;

in a further step S63, the phase difference $\Delta\phi_x$ between the received amplitude modulated probe signals $AMPS_1$, $AMPS_2$ is calculated at the receiver side;

in a further step S64, the second laser diode providing the second probe signal is tuned to another wavelength $\lambda_y$;

then, in a further step S65, the phase difference $\Delta\phi_y$ between the probe signal at the reference wavelength $\lambda_{ref}$ and the probe signal at the tuned wavelength $\lambda_y$ is calculated: and in step S66, the tunable dispersion compensation module is tuned until the phase difference $\Delta\phi_x$ is equal to the calculated phase difference $\Delta\phi_y$;

wherein steps S61 and S64 are iterated to improve the accuracy of the chromatic dispersion compensation.

28. The transceiver card according to claim 27 comprising a booster amplifier adapted to amplify the generated amplitude modulated probe signals and the wavelength division multiplexed, WDM, signals transmitted through said optical transmission link and/or a preamplifier adapted to amplify the amplitude modulated probe signals and to amplify the wavelength division multiplexed, WDM, signals received through said optical transmission link.

29. The transceiver card according to claim 28, further comprising an optical WDM multiplexer adapted to multiplex WDM signals to said booster amplifier and/or an optical WDM demultiplexer adapted to demultiplex WDM signals amplified by said preamplifier.

* * * * *

UNITED STATES PATENT AND TRADEMARK OFFICE
CERTIFICATE OF CORRECTION

PATENT NO. : 10,404,397 B2
APPLICATION NO. : 14/757689
DATED : September 3, 2019
INVENTOR(S) : Alfiad et al.

Page 1 of 1

It is certified that error appears in the above-identified patent and that said Letters Patent is hereby corrected as shown below:

On the Title Page

Item (72), Inventors:
Replace "Fuerst Cornelius"
With --Cornelius Fuerst--

Signed and Sealed this
Eighteenth Day of August, 2020

Andrei Iancu
*Director of the United States Patent and Trademark Office*